(12) United States Patent
Murakami

(10) Patent No.: US 11,180,065 B2
(45) Date of Patent: Nov. 23, 2021

(54) BEVERAGE CONTAINER HOLDING DEVICE

(71) Applicant: MORIROKU TECHNOLOGY COMPANY, LTD., Tokyo (JP)

(72) Inventor: Kiyoshi Murakami, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 0 days.

(21) Appl. No.: 17/101,305

(22) Filed: Nov. 23, 2020

(65) Prior Publication Data

US 2021/0178952 A1 Jun. 17, 2021

(30) Foreign Application Priority Data

Dec. 13, 2019 (JP) ................................. 2019-225165

(51) Int. Cl.
*B60N 3/00* (2006.01)
*B60N 3/10* (2006.01)

(52) U.S. Cl.
CPC .................... *B60N 3/108* (2013.01)

(58) Field of Classification Search
None
See application file for complete search history.

(56) References Cited

U.S. PATENT DOCUMENTS

| | | | | |
|---|---|---|---|---|
| 5,060,899 | A * | 10/1991 | Lorence | B60N 3/102 248/311.2 |
| 6,843,397 | B2 * | 1/2005 | Then | B60N 2/0224 224/552 |
| 9,211,828 | B2 * | 12/2015 | Masuda | B60N 3/102 |
| 9,796,317 | B2 * | 10/2017 | Neumann | E05D 15/0604 |
| 9,919,634 | B2 * | 3/2018 | Flothmann | B60N 3/108 |
| 10,363,855 | B2 * | 7/2019 | Dyle Kim | B60N 3/106 |
| 10,506,890 | B2 * | 12/2019 | Sawada | A47G 23/0216 |
| 10,745,969 | B1 * | 8/2020 | Robertson | E06C 7/14 |
| 10,894,496 | B2 * | 1/2021 | Sukumar | B60R 13/02 |
| 10,981,484 | B2 * | 4/2021 | Bone | B60N 3/102 |
| 2014/0299612 | A1 * | 10/2014 | Brinas | B60N 3/102 220/600 |

FOREIGN PATENT DOCUMENTS

JP 4628171 11/2010
JP 2016-101769 6/2016

* cited by examiner

*Primary Examiner* — Steven M Marsh
(74) *Attorney, Agent, or Firm* — Rankin, Hill & Clark LLP

(57) ABSTRACT

A beverage container holding device includes a storage member having a storage space whose top is open and which is configured to receive a beverage container, and a movable floor mounted to the storage member such that the movable floor can move up and down and is configured to support to bottom of the beverage container. The storage member includes support members that advance into the storage space to support the beverage container, and support biasing members for causing the support members to advance into the storage space. The movable floor has support retracting members for causing the support members to move backward such that the support members retract from the storage space.

11 Claims, 19 Drawing Sheets

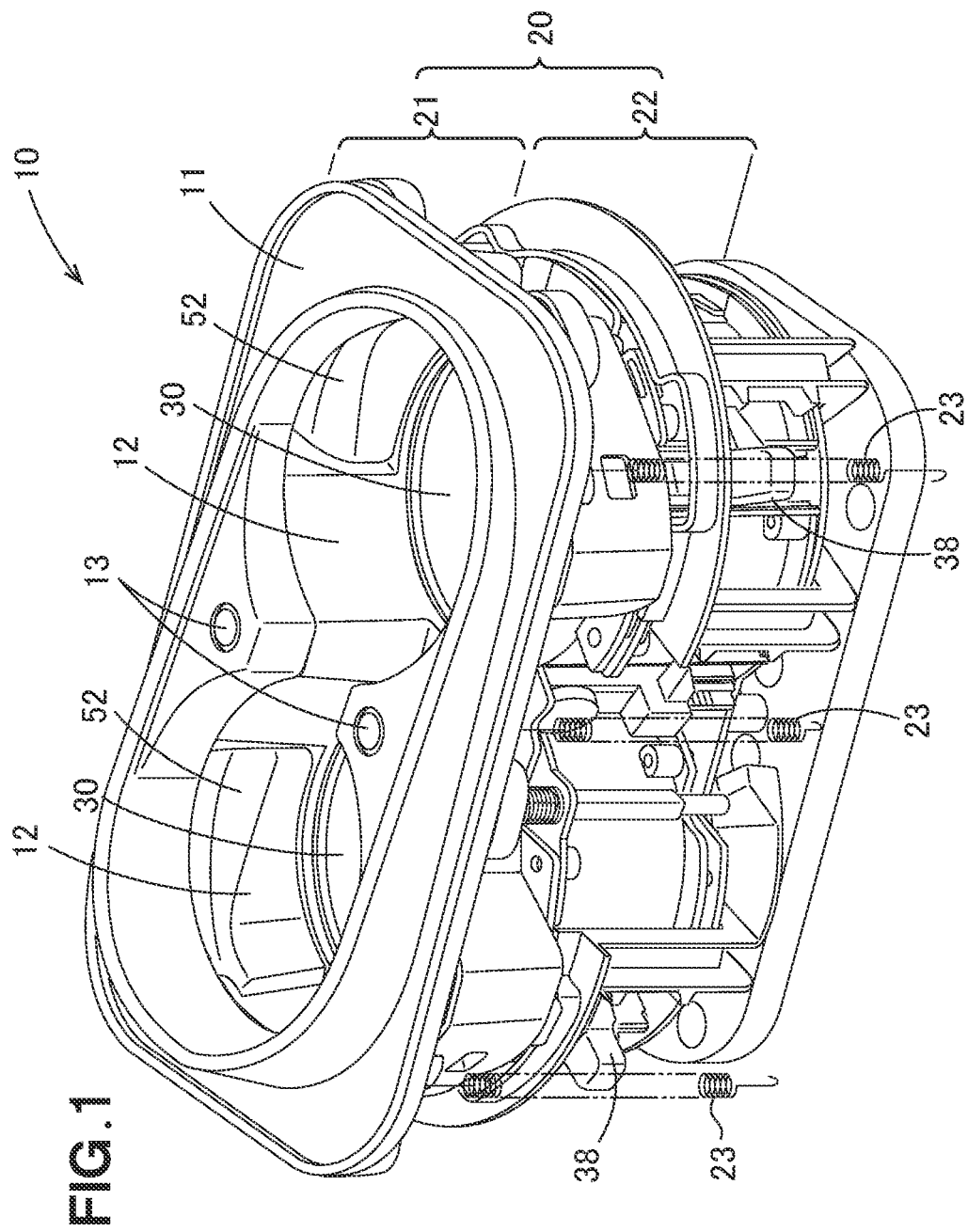

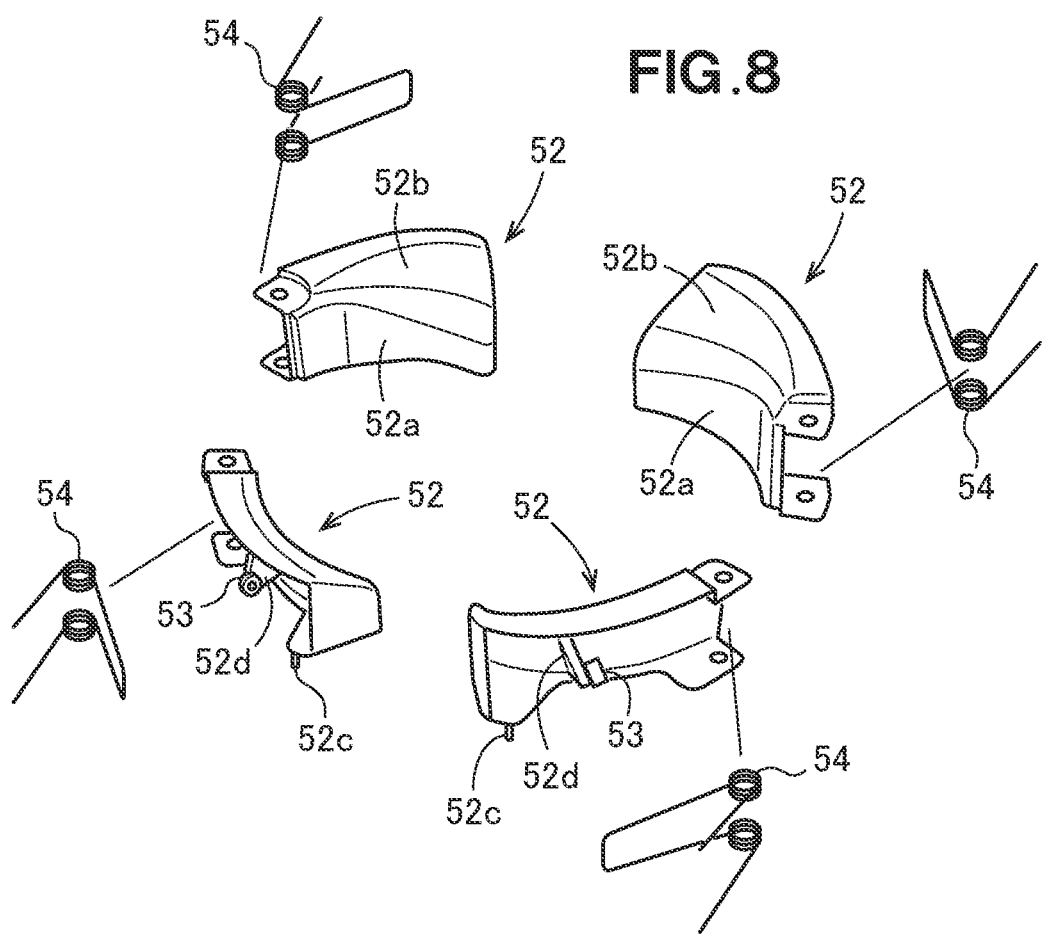

BEVERAGE CONTAINER HOLDING DEVICE

FIELD OF THE INVENTION

The present invention relates to a beverage container holding device, which is also referred to as a cup holder.

BACKGROUND OF THE INVENTION

A cup holder is provided in a vehicle. A person in the vehicle inserts a beverage container into the cup holder and picks up the beverage container from the cup holder when he/she wants to take liquid from the beverage container. Since the vehicle unavoidably shakes, the cup holder also shakes. It is unpreferable that the beverage container moves in the cup holder as the cup holder shakes. The movement of the beverage container in the cup holder can be prevented by a support member or support members.

Therefore, various types of cup holder having a support member have been proposed.

For example, a known configuration of a cup holder having support members is disclosed in Japanese Patent Application Laid-Open Publication No. 2016-101769.

The configuration disclosed in Japanese Patent Application Laid-Open Publication No. 2016-101769 will be described with reference to a drawing (FIG. 15).

FIG. 1 shows a perspective view of a conventional cup holder.

A cup holder 100 includes support members 102, each of which is a vertically elongated element and protrudes forward into a storage space 101. When the beverage container is inserted into the cup holder from above, the support members 102 move backward and retract. Each of the support members 102 supports the beverage container with a spring force.

However, the configuration disclosed in Japanese Patent Application Laid-Open. Publication No. 2016-101769 has room for improvements in terms of appearance because the vertically elongated support members 102 always come into view when the cup holder is not in use.

Cup holders with improved appearance have been proposed.

For example, a known configuration of a cup holder having an improved appearance is disclosed in Japanese Patent No. 4628171.

The configuration disclosed in Japanese Patent No. 4628171 will be described with reference to a next drawing (FIG. 16).

FIG. 16 shows a perspective view of another conventional cup holder.

A cup holder 110 includes arcuate support members 112 which are retracted from a storage space 111, and a tongue-shaped drive member 113 for advancing the support members 112 into the storage space 111.

When a person in a vehicle pushes the drive member 113 downward by a beverage container, a pair of support members 112 are caused to move by the drive member 113. Specifically, a pair of support members 112 advance into the storage space 111 to support the beverage container.

The drive member 113 returns when the person in the Vehicle pulls up the beverage container, and the support members 112 retract from the storage space 111.

When the cup holder is not in use, the support members 112 are situated outside the storage space 111, and therefore improvements in appearance are achieved. However, when the cup, holder is not in use, the tongue-shaped drive member 113 comes into view.

Incidentally, beverage containers include regular-sized cans and slim-sized cans with diameters smaller than the regular-sized can. When the slim-sized can is inserted in the storage space, the slim-sized can may not hit the drive member 113. If the can does not hit the drive member 113, the support members 112 do not advance and cannot exert a support action to the can.

As a countermeasure, the drive member 113 may be elongated such that the drive member extends or protrudes to the center of the storage space 111. Then, the slim-sized can hit the drive member 113. On the other hand, the large drive member 113 impairs the appearance.

Therefore, each of the conventional cup holder 100 and the cup holder 110 has room for improvement in appearance.

Because improvement in appearance is required, there is a demand for a cup holder (beverage container holding device) whose support members actuate in a reliable manner even when a beverage container has a small diameter.

SUMMARY OF INVENTION

An object of the present invention is to provide a beverage container holding device which has a good appearance, and includes a support member (or support members) configured to operate in a reliable manner if a beverage container has a small diameter.

According to a first embodiment of the present invention, there is provided a beverage container holding device including a storage member having a storage space whose top is open and configured to receive a beverage container, and a movable floor attached to the storage member such that the movable floor can move up and down and is configured to support a bottom of the beverage container, the storage member includes at least one support member configured to advance into the storage space and support the beverage container, and at least one support biasing member associated with the support member(s) respectively for causing the support member(s) to advance into the storage space, and the movable floor has at least one support retracting member associated with the support member(s) respectively for causing the support member(s) to move backward and retract from the storage space.

In the first embodiment of the present invention, the movable floor that supports the bottom of the beverage container is equipped with the support retracting member(s), and each support retracting member causes the associated support member to move backward and retract from the storage space.

When the support member(s) is not in use (when the beverage container holding device is not in use), the appearance of the beverage container holding device is good because the support member(s) is outside the storage space.

Preferably, when the movable floor is in a standby position, each support retracting member causes the associated support member to retract from the storage space. When the movable floor is lowered a predetermined distance from the standby position, each support retracting member causes the associated support member to advance into the storage space.

The beverage container always contacts the movable floor regardless of whether the outer diameter of the beverage container is large or small. The movable floor becomes a driving source for causing the support member(s) to retract from the storage space. Thus, the appropriate operation of the support member(s) is ensured. As a result, provided is the beverage container holding device that has a good appearance and includes the support member(s) operating in a reliable manner even if the beverage container has a small diameter.

Preferably, each support member has an arcuate shape that bends along an edge of the storage space of the storage member, and one end of each support member is fastened to the storage member such that each support member can pivot or swing horizontally, each support member has a stay extending to the associated support retracting member, and an annular bearing is provided on one of an tipper portion of the stay and an upper portion of the support retracting member such that the annular bearing can rotate, and a cam drive surface that the annular bearing contacts is provided (formed) on the other of the upper portion of the stay and the upper portion of the support retracting member, such that each support member is retracted from the storage space by the associated support retracting member that moves up.

The support member has an arcuate shape that bends along the edges of the storage space. The outer circumferential length in a plan view of the beverage container is considered. As compared with the vertically elongated support member, the support member having the arc shape can cover a large outer circumferential length, and increases the certainty (reliability) of supporting the beverage container.

Further, since the annular bearing is provided on one of the stay of the support member and the support retracting member, the annular bearing is interposed between the stay of the support member and the support retracting member.

If a structure in which a support retracting member is directly in contact with the stay without using an annular bearing is adopted, sliding frictional resistance is get rated between the stay and the support retracting member. In contrast, since the annular bearing is used in the invention, rolling frictional resistance is generated between the stay and the support retracting member. This rolling frictional resistance is much smaller than the sliding frictional resistance. As a result, the pivoting motion of the support member becomes significantly smooth in the configuration of the invention.

Preferably, each support member has an arcuate shape that bends along the edge of the storage space of the storage member, and one end of each support member is fastened to the storage member such that each support member can horizontally pivot, each support member has a stay extending to the associated support retracting member, and an inclined surface is provided (formed) on one of the upper portion of the stay and the upper portion of each support retracting member, and a cam drive surface that the inclined surface contacts is provided (formed) on the other of the upper portion of the stay and the upper portion of the support retracting member, such that each support member is retracted from the storage space by the associated support retracting member that moves up.

The support member has the arcuate shape that bends along the edge of the storage space. The outer circumferential length in a plan view of the beverage container is considered. As compared with the vertically elongated support member, the support member having the arc shape can cover a large outer circumferential length, and increases the certainty (reliability) of supporting the beverage container.

Since no annular bearing is used, the number of parts can be reduced, and the structure is simplified.

Preferably, when each support member advances into the storage space, the stay is moved away from the associated support retracting member.

The support retracting member moves down together with the movable floor. The support retracting member unavoidably shakes during the downward movement. However, when the support member advances into the storage space, the stay is away from the support retracting member, and therefore the shaking (vibrations) of the support retracting member is not transmitted to the stay. As a result, it is possible to suppress or avoid the generation of the vibrations and noises caused by the vibrations.

Preferably, each support member has a vertical surface as a front thereof and a guide surface that extends outwardly hand upwardly in an oblique fashion from an upper edge of the vertical surface.

It may happen that the support member remains in the storage space due to some trouble when the beverage container holding device is not in use (when the beverage container is not received in the storage space). In this instance, as a person in a vehicle inserts the beverage container into the storage space, the bottom of the beverage container abuts the guide surface. The support member is caused to retract from the storage space by a horizontal component of a force applied to the guide surface.

Therefore, evens if the support member remains in the storage space while the beverage container holding device is not in case, it is possible to continuously use the beverage container holding device until the repairing.

Preferably, the two support members are arranged symmetrically with respect to an axis of line symmetry, each support member is supported by a rotation center such that each support member can rotate about the rotation center, and has a distal end at a location away from the rotation center, and a line that passes through a center of the storage space and is perpendicular to the axis of line symmetry is present between the distal end and the rotation center.

The distal end of each support member protrudes from the line that passes through the center of the storage space and is perpendicular to the axis of line symmetry. The support members can support the beverage container in a stable manner.

Preferably, the two support members are arranged symmetrically with respect to the axis of line symmetry, each support member is supported by a rotation center such that each support member can rotate about the rotation center, and has a distal end at a location away from the rotation center, and a line that passes through the center of the beverage container and is perpendicular to the axis of line symmetry is present between an intersection, at which a locus of the distal end about the rotation center intersects the beverage container, and the rotation center.

The distal end of each support member protrudes from the line that passes through the center of the beverage container and is perpendicular to the axis of line symmetry. It is relatively easy for the support members to move (pull) the beverage container toward the rotation center, and the support members can support a stable manner the beverage container having a small diameter such as slim-sized can.

BRIEF DESCRIPTION OF THE DRAWINGS

Hereinafter, some preferred embodiments of the present invention will be described in detail with reference to the accompanying drawings, in which FIG. 1 is a perspective view of a beverage container holding device according to an embodiment of the present invention, FIG. 8 is a perspective view of support members, FIG. 9A to FIG. 9C is a set of diagrams useful to describe the action of the support member; specifically.

DETAILED DESCRIPTION OF THE PREFERRED EMBODIMENTS

Figure 2A:
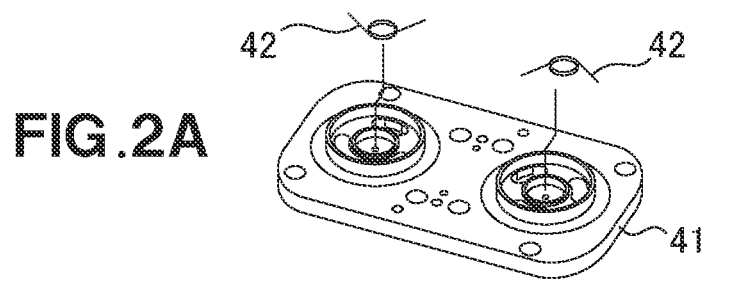
FIG. 2A to FIG. 2D are a series of drawings to illustrate the steps of preparing a first assembly.

A beverage container holding device 10 according to an embodiment will be described below with reference to the accompanying drawings.

Referring to FIG. 1, the beverage container holding device 10 includes a storage member 20 having two storage spaces 12. The storage member 20 has an upper panel 11 on top.

The upper panel 11 includes two unlock buttons 13.

A movable floor 30 is visible in each of the two storage spaces 12. The movable floor 30 is in the uppermost "standby position".

The storage member 20 includes an upper cylindrical body 21 in contact with the upper panel 11, and a lower cylindrical body 22 extending downward from the upper cylindrical body 21. It should be noted, however, that the storage member 20 may have a one-piece structure, i.e., the upper cylindrical body may be integral with the lower cylindrical body.

A plurality of movable floor biasing members 23 extend downward from the upper cylindrical body 21. Each of the movable floor biasing members 23 is preferably a tension coil spring. For convenience of illustration, the lower end of each movable floor biasing member 23 is free in FIG. 1, but in reality the lower end of each movable floor biasing member 23 hooks at a spring hanging portion 38.

The beverage Container holding device 10 of the embodiment receives (holds) two beverage containers, but may receive only one beverage container. If the beverage container holding device 10 receives only one beverage container, the beverage container holding device 10 includes a single storage space 12 and a single unlock button 13.

In this beverage container holding device 10, beverage containers having different sizes can be inserted.

For example, the beverage container may be a 350 ml can called a regular-sized can, a 500 ml can called a long-sized can, or a 250 ml can called a slim-sized can.

The long-sized can has the same diameter as the regular-sized can, but are longer (taller) than the regular-sized can.

The slim-sized can has the same length as the regular-sized can, but smaller in diameter than the regular-sized can.

It should be noted that although the beverage containers are exemplified by the "cans" in this specification, the beverage containers may be PET (polyethylene terephthalate) bottles and glass bottles and the embodiment of the present invention can be applied when the beverage containers are the PET bottles and glass bottles.

When inserting a long-sized can in the storage space 12 of the beverage container holding device 10, the movable floor 30 is lowered to a "lower use position", which is the lowest position.

When inserting a regular-sized can or a slim-sized can in the storage space 12, the movable floor 30 is lowered to an "upper use position" above the lower use position.

When the movable floor 30 returns to the "standby position" which is above the upper use position, the upper portion of the beverage container protrudes from the upper panel 11, and it is easy for a person to catch or grasp the beverage container.

A detailed configuration of the beverage container holding device 10 will be described with reference to FIG. 2A to FIG. 5.

As shown in FIG. 2A, a rectangular lower plate 41 is prepared, and two torsion springs 42 are set on the lower plate 41.

Figure 2B:
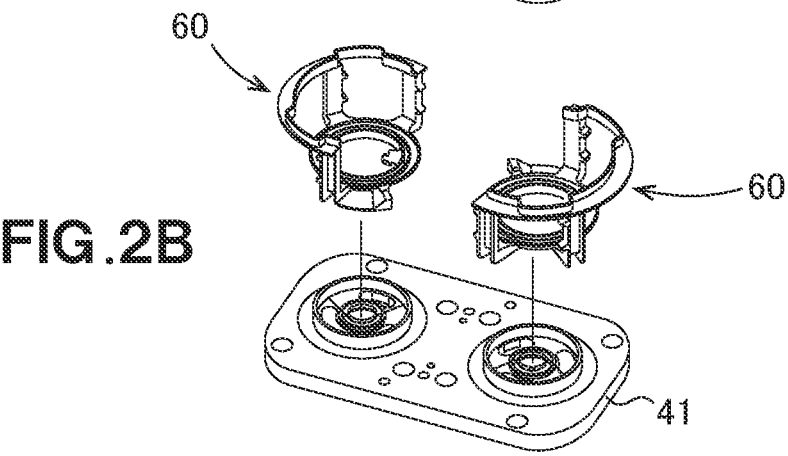

As shown in FIG. 2B, two cage-shaped movable floor locking members 60 (details will be described with reference to FIG. 6.) are placed on the lower plate 41. At this time, one end of each of the two torsion springs 42 is fastened to the associated movable floor locking, member 60, and the other end is fastened to the lower plate 41. Then, each of the movable floor locking members 60 is biased in the locking direction about the vertical axis with respect to the lower plate 41.

Figure 2C:
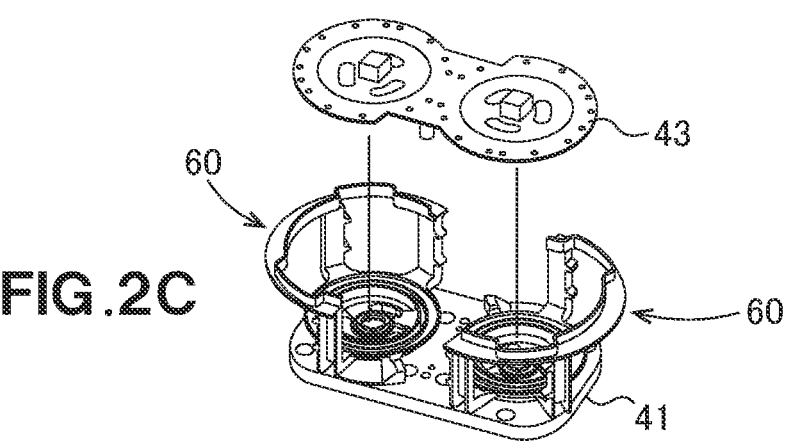

As shown in FIG. 2C, an upper plate 43 is placed on the movable floor locking members 60.

Figure 2D:
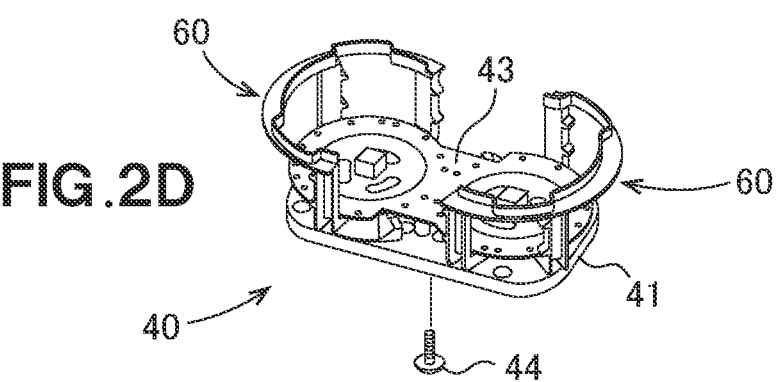

As shown in FIG. 2D, the upper plate 43 is fixed to the lower plate 41 by screws 44. As a result, each of the movable floor locking members 60 is able to rotate about a vertical axis, but is not able to move up and down.

Thus, construction of the first assembly 40 is completed.

Figure 3A:
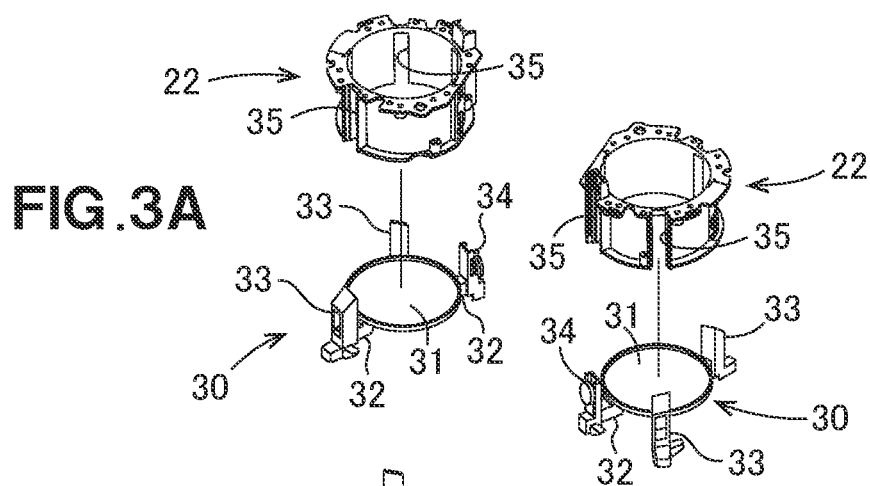
FIG. 3A to FIG. 3D are a series of drawings to illustrate the steps of preparing a lower assembly.

As shown in FIG. 3A, the two lower cylindrical bodies 22 and the two movable floors 30 are prepared.

Three branch portions 32 extend horizontally from a disc portion (round plate) 31 of each of the movable floors 30 (details will be described with reference to FIG. 6), and a columnar support retracting member 33 or a plate-shaped mask member 34 stands from each of the branch portions 31.

Each of the loner cylindrical bodies 22 has three rows of through grooves 35, and the branch portions 32 are received in the through grooves 35, respectively.

Thus, construction of two second assemblies (reference numeral 46 in FIG. 3B) is completed.

Figure 3B:
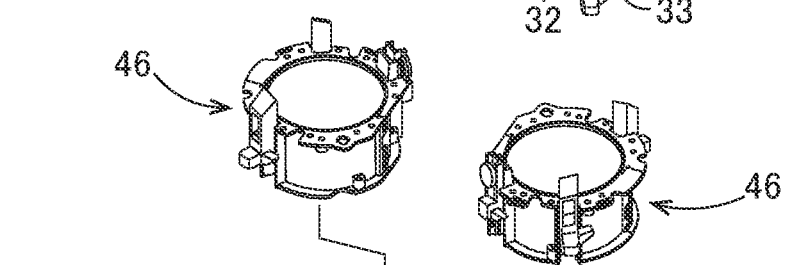

As shown in FIG. 3B, the second assemblies 46 are set on the first assembly 40.

Figure 3C:
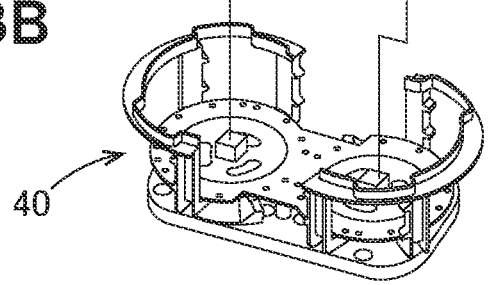

As shown in FIG. 3C, construction of a third assembly 47 is completed.

Figure 3D:
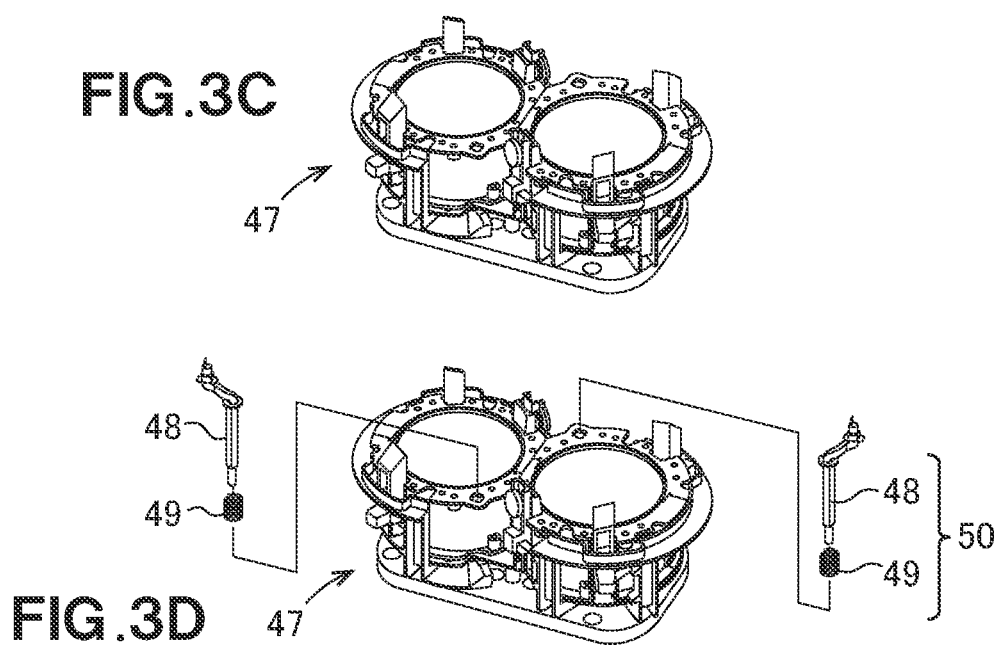
Figure 7:
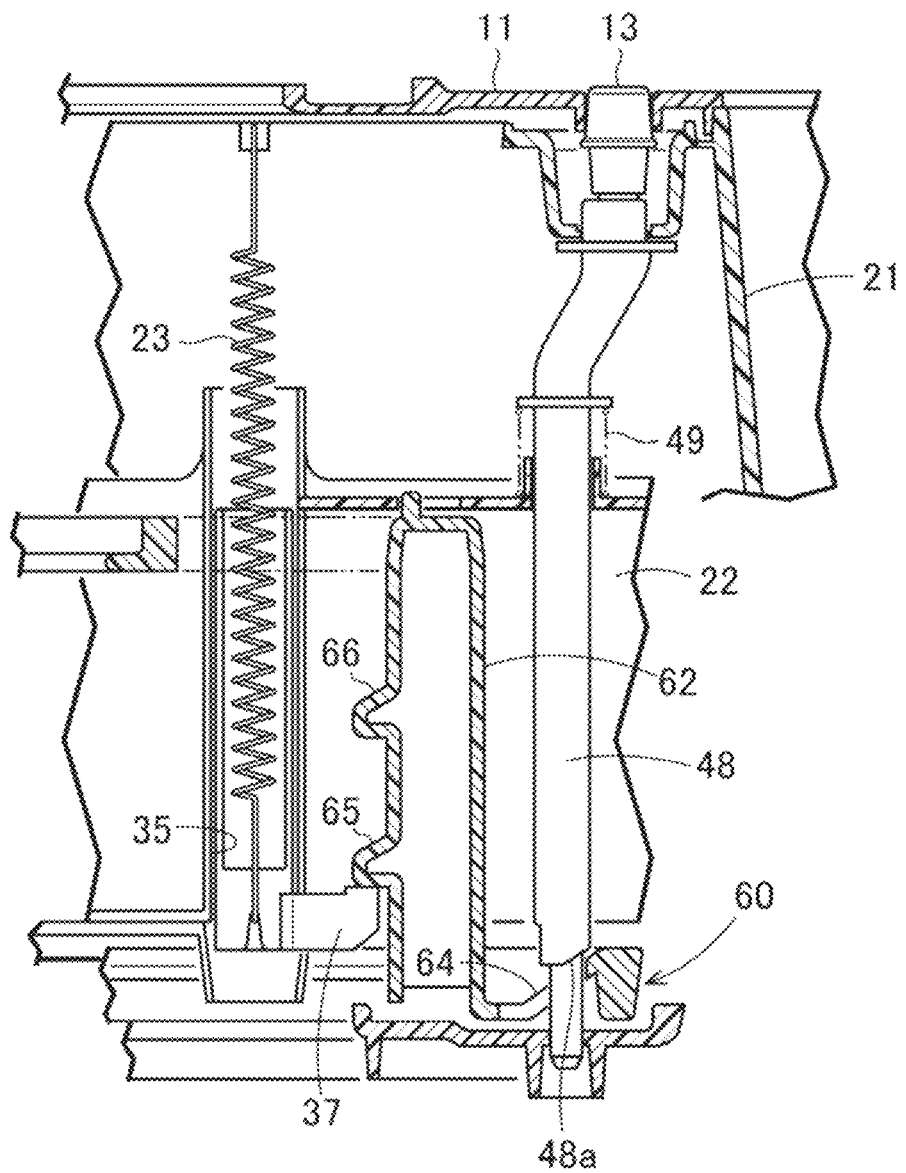
FIG. 7 is a diagram useful to describe an operation of a release rod.

As shown in FIG. 3D, two pairs of a crank-shaped release rod 48 and a compression spring 49 are set on the third assembly 47 (the configuration after the setting is shown in FIG. 7).

Thus, construction of the lower assembly 50 is completed.

Figure 4A:
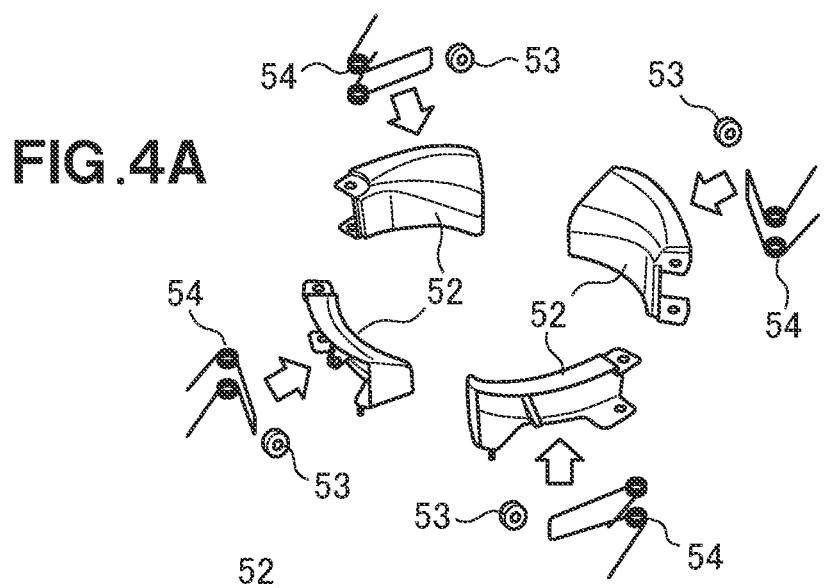
FIG. 4A to FIG. 4C are a series of drawings to illustrate the steps of preparing an upper assembly.

As shown in FIG. 4A, arc-shaped support members 52 (details will be described with reference to FIG. 8,), annular hearings 53 and support biasing members 54 are prepared. Each of the annular bearings 53 is mounted in advance at a predetermined position of the associated support member 52. The support biasing member 54 is preferably a torsion spring that is folded three-dimensionally. The support biasing member 54 abuts on the back surface of the associated support member 52.

Figure 4B:
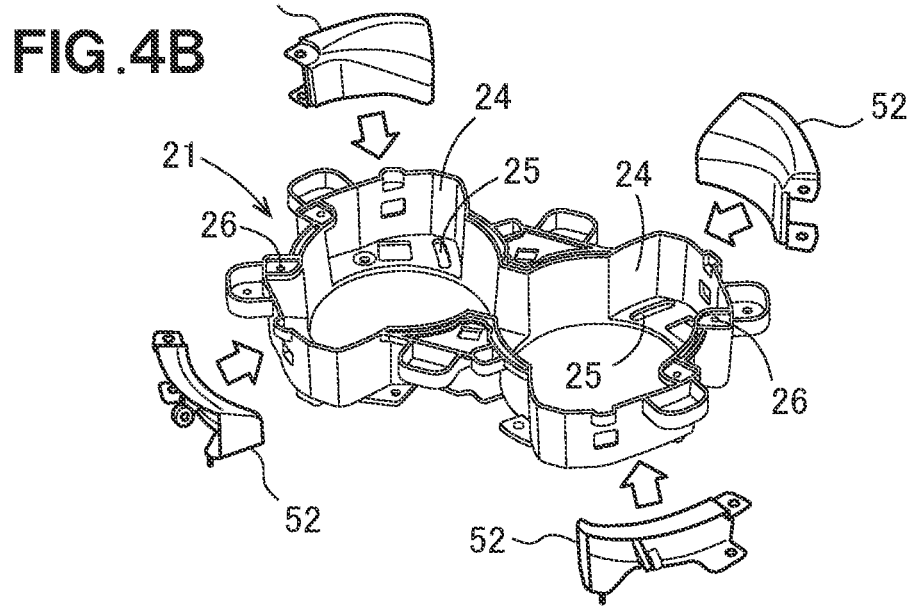

As shown in FIG. 4B, the upper cylindrical body 21 has four pockets 24. An arc groove 25 is formed in the bottom of each of the pockets 24. A pin hole 26 is formed at a location far from the arcuate groove 25 of each pocket. Each of the support members 52 is set in the associated pocket 24A such that a stopper projection that extends downward from the support member 52 (reference numeral 52c in FIG. 8) fits in the arc groove 25.

Figure 4C:
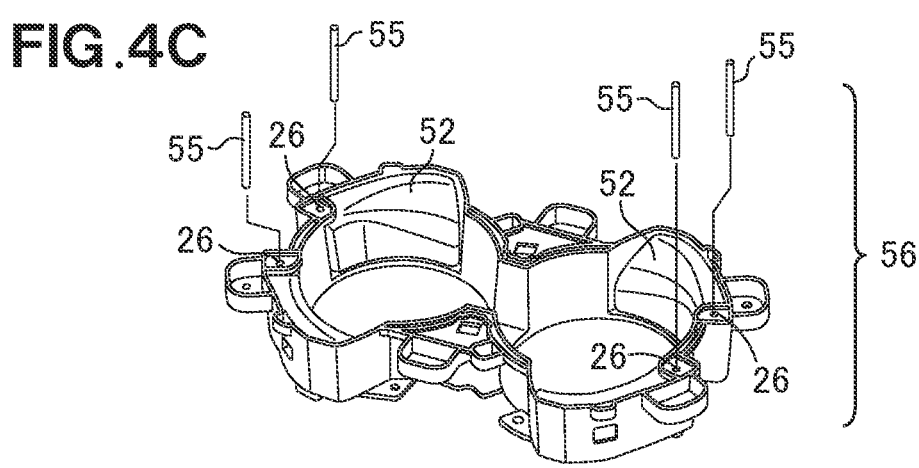

As shown in FIG. 4C, four long pins 55 are inserted into the four pin holes 26, respectively. Each of the long pins 55 constitutes a rotation center 55 of the associated support member 52.

Therefore, the support members 52 are secured to the upper cylindrical body 21 such that the support members can horizontally rotate about the long pins 55, respectively.

Thus, construction of the upper assembly 56 is completed.

Incidentally, the rotation center 55 may be a short pin, rather than the long pin 55, i.e., the rotation center 55 is not limited to the long pin 55.

Figure 5:
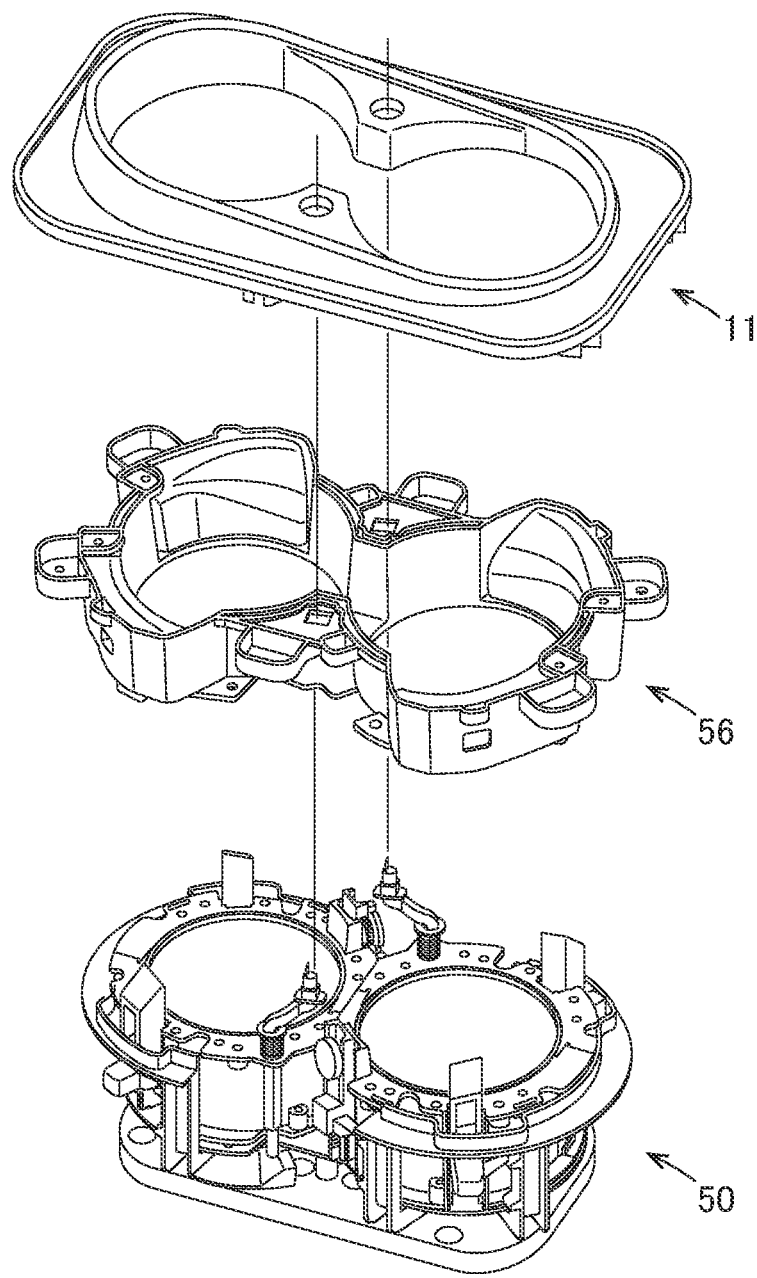
FIG. 5 is a view useful to describe a procedure for mounting the upper assembly and an upper panel to the lower assembly.

As shown in FIG. 5, the upper assembly 56 is placed on the lower assembly 50, the upper panel 11 is placed on the upper assembly 56, and the lower assembly 50, the upper assembly 56 and the upper panel 11 are fastened together by screws or the like. Then, the movable floor biasing members (reference numeral 23 in FIG. 1) are mounted.

Thus, construction of the beverage container holding device 10 shown in FIG. 1 is completed.

Figure 6:
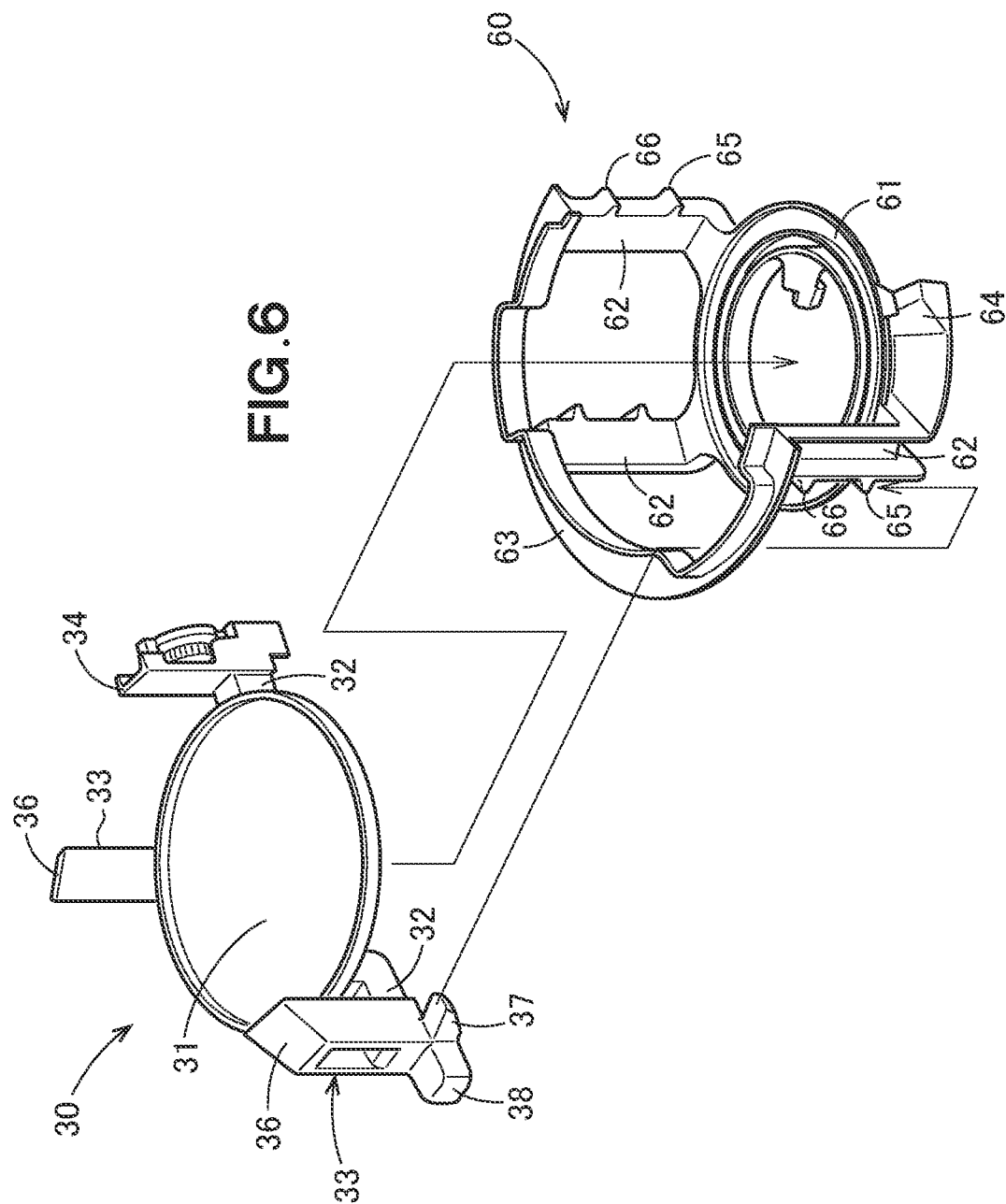
FIG. 6 is a perspective, view of a movable floor and a movable floor locking member.

As shown in FIG. 6, the movable floor locking member 60 includes an annular member 61, a plurality of column members 62 (three in this embodiment) standing from the annular member 61, and a C-shaped connecting member 63 for connecting the upper ends of the column members 62. The annular member 61 has a cam surface 64. Each of the column members 62 has a lower locking piece 65 protruding horizontally and an upper locking piece 66 protruding horizontally.

The movable floor 30 includes the disc portion 31, the three branch portions 32, the two support retracting members 33 and the mask member 34.

Each of the support retracting members 33 has a cam drive surface 36 at its upper end, and the cam drive surface 36 is an inclined surface. The support retracting member 33 also has a claw portion 37 and the spring hanging portion 38 at its lower end.

The claw portion 37 engages with the lower locking piece 65 or the upper locking piece 66. The lower, end of the movable floor biasing member (reference numeral 23 in FIG. 1) is secured to the spring hanging portion 38. Thus, the movable floor 30 is biased upward.

As described in connection with FIG. 1, a regular-sized cantor cans), a long-sized can (or cans) or a slim-sized can (or cans) is inserted in the beverage container holding device 10 of the embodiment of the present invention.

As shown in FIG. 7, when the long-sized can is inserted in the storage space of the beverage container holding device 10 from above, the movable floor 30 is lowered to the "lower use position". Then, the claw portion 37 engages with the lower locking piece 65. Since the movable floor 30 is biased in the locking direction by the torsion spring 42 described in connection with FIG. 2A, the claw portion 37 is biased to the column member 62 in FIG. 7. Therefore, the claw portion 37 does not come off (disengage) from the lower locking piece 65.

Before taking out the long-sized can from the storage space of the beverage container holding device 10, a person in the vehicle pushes down the unlock button 13. Then, the release rod 48 is lowered against the compression spring 49. A cam portion 48a which defines an inclined surface is formed in the lower portion of the release rod 48, and the cam portion 48a pushes the cam surface 64. The column member 62 is caused to move together with the cam surface 64 by a horizontal component of an applied force such that the column member 62 is shifted away from the claw portion 37. As a result, the lower locking piece 65 disengages from the claw portion 37. Then, the biasing action of the movable floor biasing member 23 causes the movable floor (reference numeral 30 in FIG. 1) to move upward together with the claw portion 37 and return to the "standby position".

In the case of a regular-sized can and a slim-sized can, the claw portion 37 engages with the upper locking piece 66. Other descriptions in connection with the regular-sized can and the slim-sized can are the same as the foregoing description, and therefore such descriptions will be omitted.

As shown in FIG. 8, each of the support members 52 has a vertical surface 52a in its front face, and a guide surface 52b extending outward obliquely and upward from an upper edge of the vertical surface 52a.

The support member 52 has the stopper projection 52c on its lower surface such that the stopper projection 52c extends downward. The support member 52 has a stay 52d on its back surface such that the stay 52d extends outward. The annular bearing 53 is mounted on the stay 52d such that the annular bearing 53 can rotate.

Figure 9A:
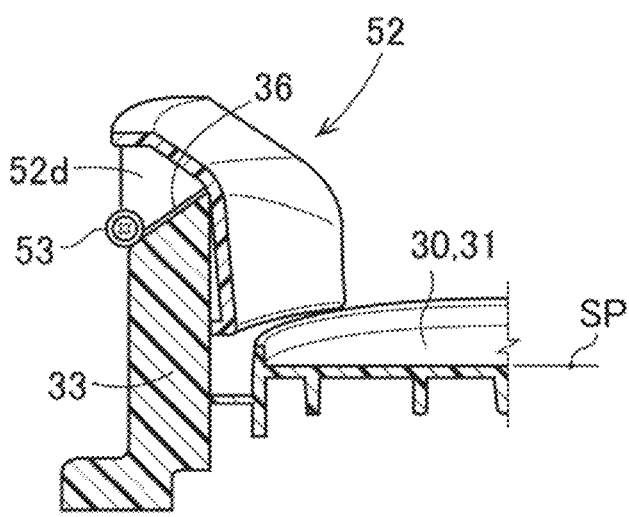
FIG. 9A is a view when the movable floor is in a standby position.

As shown in FIG. 9A, when the movable floor 30 is raised to the standby position SP, the support retracting member 33 is also raised, and the annular bearing 53 is caused to move to the left in the drawing (in the direction of retracting from the storage space) by the cam drive surface 36 formed at the upper end of the support retracting member 33.

Figure 10:
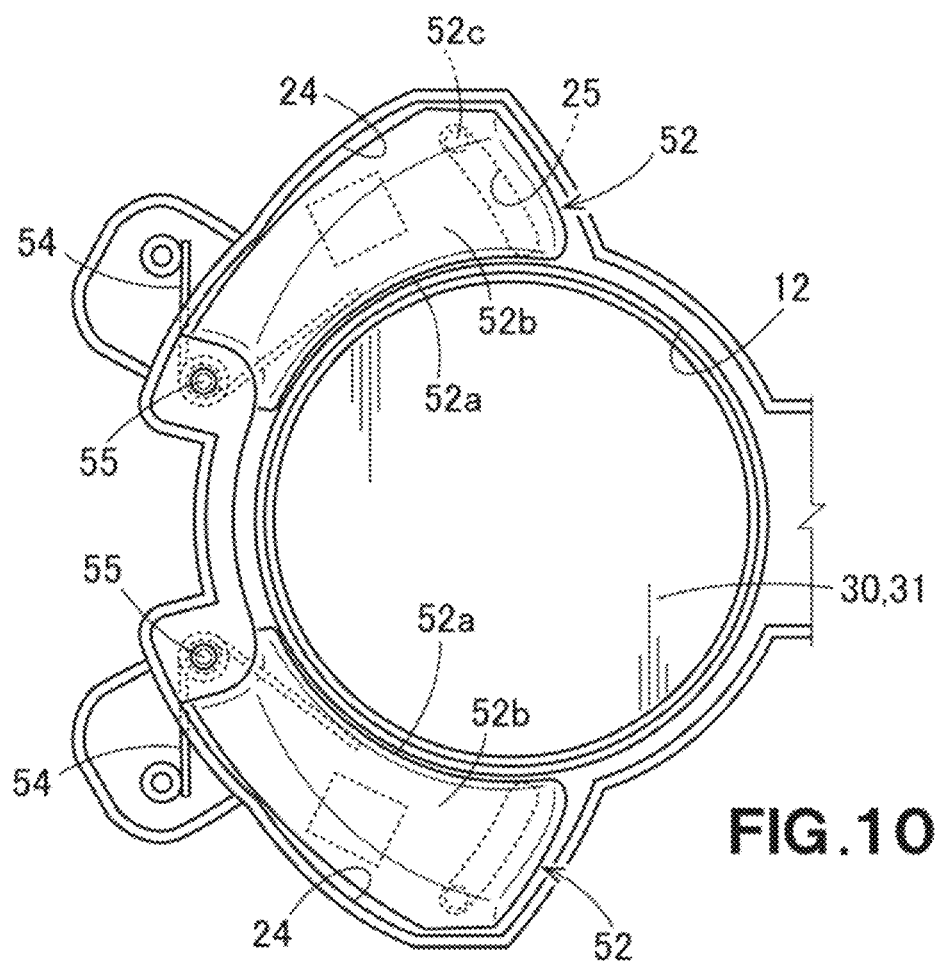
FIG. 10 is a plan view of major elements when the movable floor is in the standby position.

As a result, as shown in FIG. 10, when the movable floor 30 is in the standby position, the support members 52 are received in the respective pockets 24 i.e., the support members 52 retract from the storage space 12. The storage space 12 exhibits (shows) a cylindrical shape, and preferred appearance is seen.

That is, the vertical surface 52a of the support member 52 has a shape similar to the edge of the storage space 12. The guide surface 52b extending outward from the upper edge of the vertical surface 52a is received in the pocket 24 so that the guide surface 52b is difficult to see. Therefore, the improvement in the appearance is made.

Figure 9B:
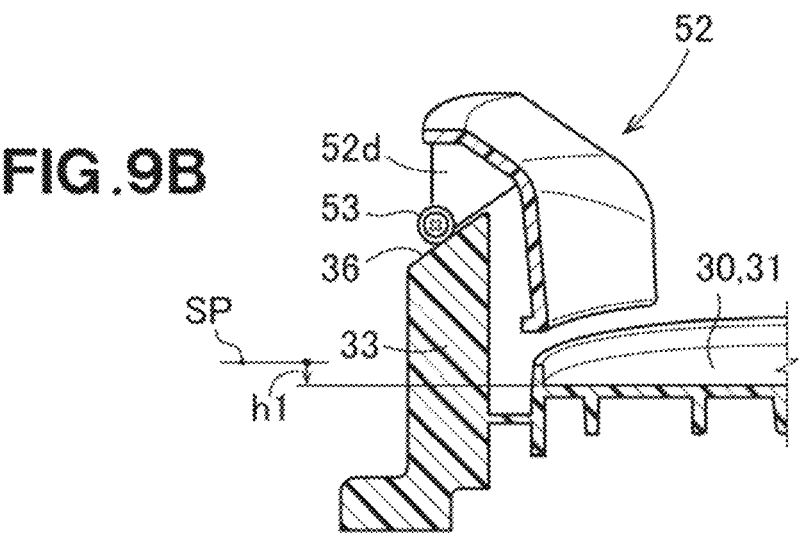
FIG. 9B is a view when the movable floor is lowered from the standby position.

As shown in FIG. 9B, when the movable floor 30 is lowered by a distance h1 from the standby position SP, the annular beating 53 moves along the cam drive surface 36 and the support member 52 begins to advance into the storage space.

Figure 9C:
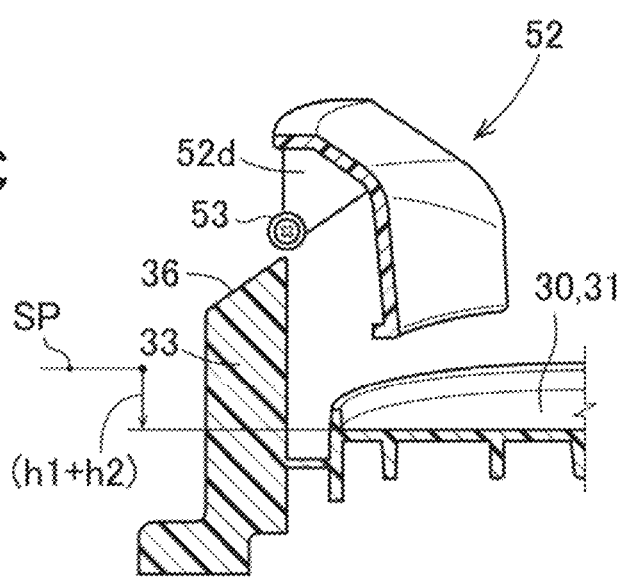
FIG. 9C is a view when the movable member is further lowered.

As shown in FIG. 9C, when the movable floor 30 is further lowered by a distance h2, the cam drive surface 36 moves away from the annular bearings 53. That is, the stay 52d is separated from the support retracting member 33.

The sum of the distance h1 and the distance h2 (h1+h2) is a "predetermined distance" to be lowered from the standby position SP.

Figure 11:
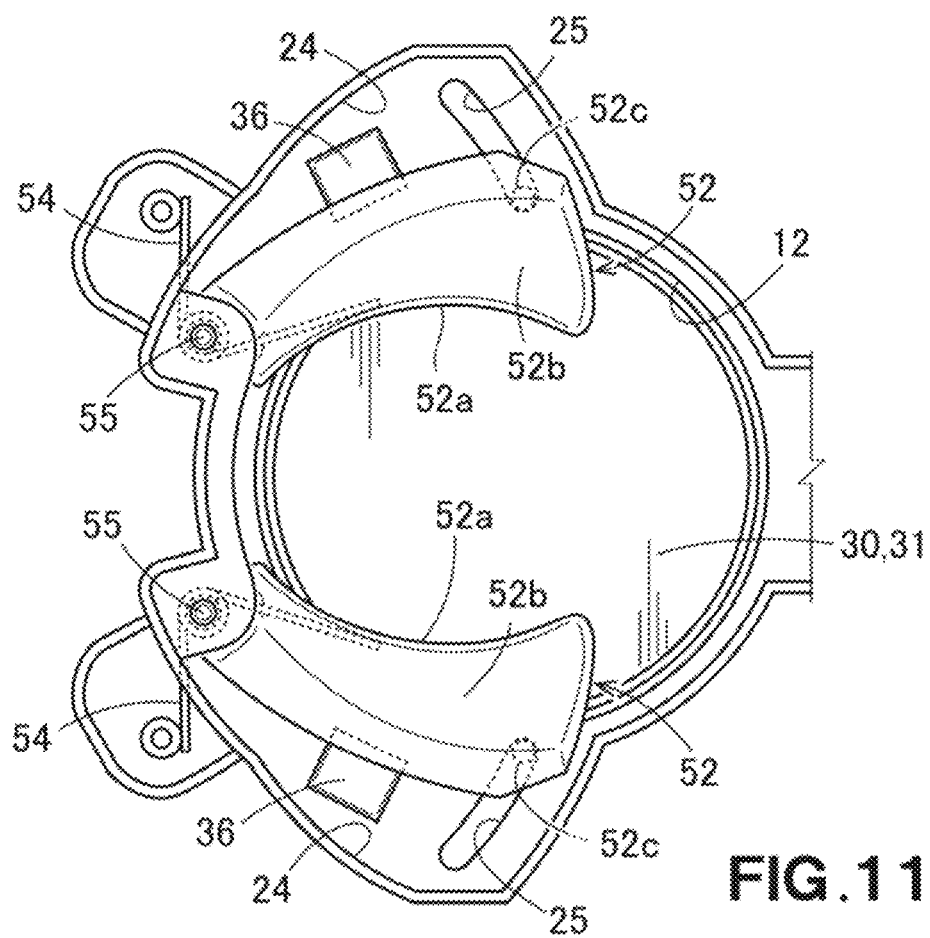
FIG. 11 is a plan view of major elements when the movable floor is lowered a predetermined distance from the standby position.

When the movable floor 30 is lowered the predetermined distance from the standby position SP, the support members 52 are biased by the support biasing members 54, respectively, so that the support members 52 horizontally pivot about the long pins 55, respectively, as shown in FIG. 11. As a result, the support members 52 are greatly advanced into the storage space 12. The advancing movements of the support members 52 continue until the stopper projections 52c abut onto one ends of the arc grooves 25, respectively. That is, a significantly narrowed pair of support members 52, support (hold) the beverage container.

A slim-sized can having a smaller diameter is also supported by a pair of support members 52.

As shown in FIG. 10, when the movable floor 30 is in the standby position (when not in use), the support members 52 are outside the storage space 12, and therefore the appearance is good.

The movable floor 30 covers the storage space 12 entirely, and the beverage container does not deviate from the movable floor 30 even if the beverage container has a small diameter.

Therefore, as shown in FIG. 11, when the movable floor 30 is lowered the predetermined distance from the standby position (during use), the beverage container is reliably supported by the movable floor 30 even if the beverage container has a small diameter.

Thus, provided is the beverage container holding device 10 that possesses a good appearance and causes the support members 52 to move properly even if the beverage container has a small diameter.

Next, a modification in which the annular bearing 53 is provided on the upper portion of each of the support retracting members 33 will be described with reference to FIG. 9D to FIG. 9F.

Figure 9D:
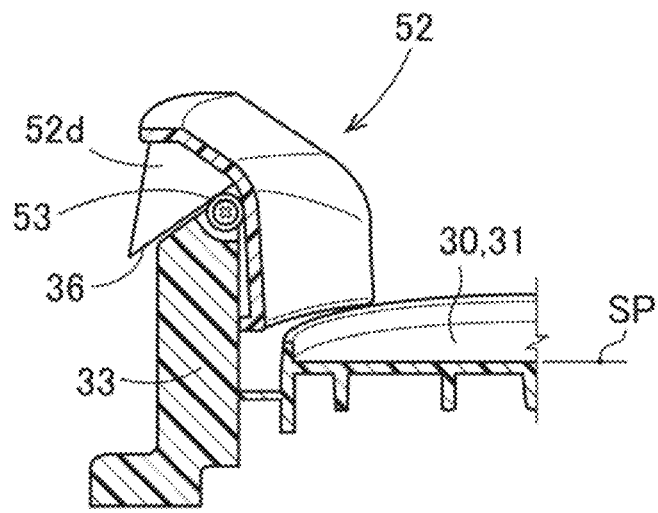
FIG. 9D to FIG. 9F are a set of diagrams to illustrate a modified configuration in which an annular bearing is provided on the support retracting member.

As shown in FIG. 9D, the annular bearing 53 is provided on the upper end of the support retracting member 33.

Figure 9E:
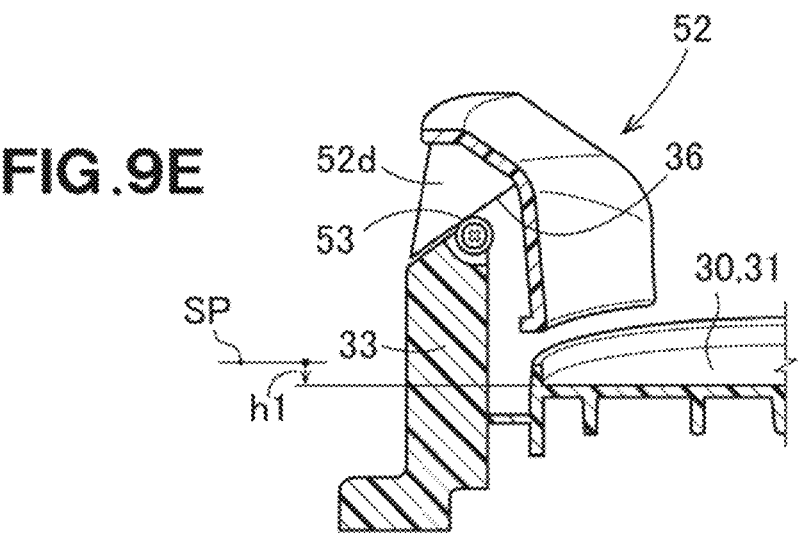

As shown in FIG. 9E, when the movable floor 30 is lowered by the distance h1 from the standby position SP, the cam drive surface 36 moves along the annular bearing 53, and the support member 52 begins to advance into the storage space.

Figure 9F:
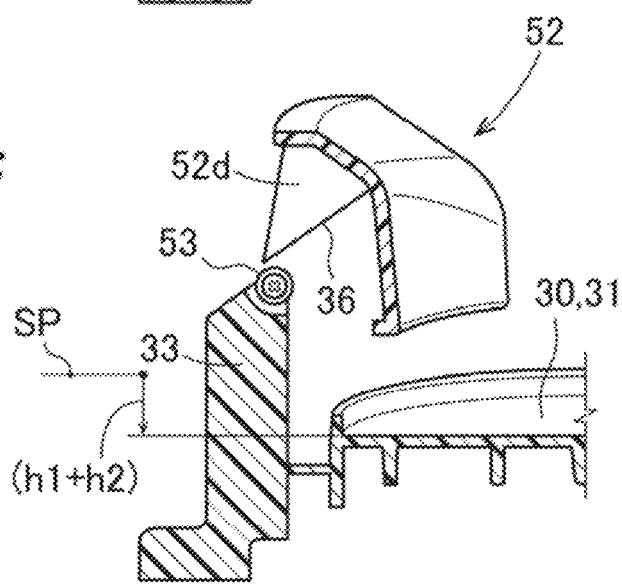

As shown in FIG. 9F, when the movable floor 30 is further lowered by the distance h2, the annular bearing 53 moves away from the cam drive surface 36. That is, the stay 52d is separated from the support retracting member 33.

Next, another modification in which the annular bearing 53 is omitted and the inclined surface 59 is formed on the stay 52d will be described with reference to FIG. 9G to FIG. 9I.

Figure 9G:
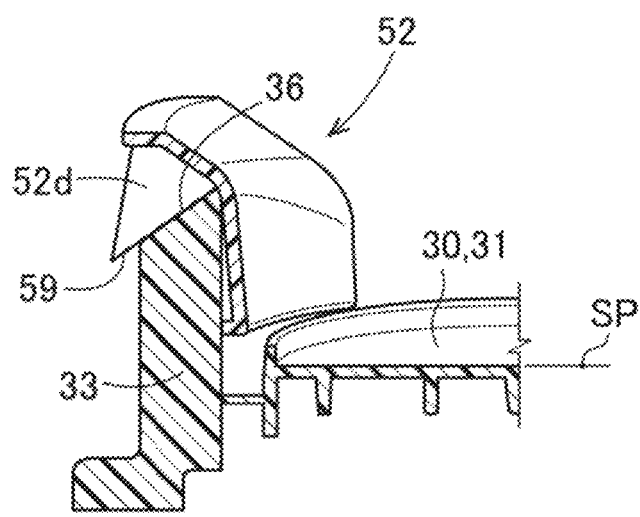
FIG. 9G to FIG. 9I are a set of diagrams to illustrate another modified configuration in which the annular bearing is omitted and a stay has an inclined surface.

As shown in FIG. 9G, an inclined surface 59 is formed on the stay 52d and a guide drive surface 36 is formed on the upper portion of the support retracting member 33.

Figure 9H:
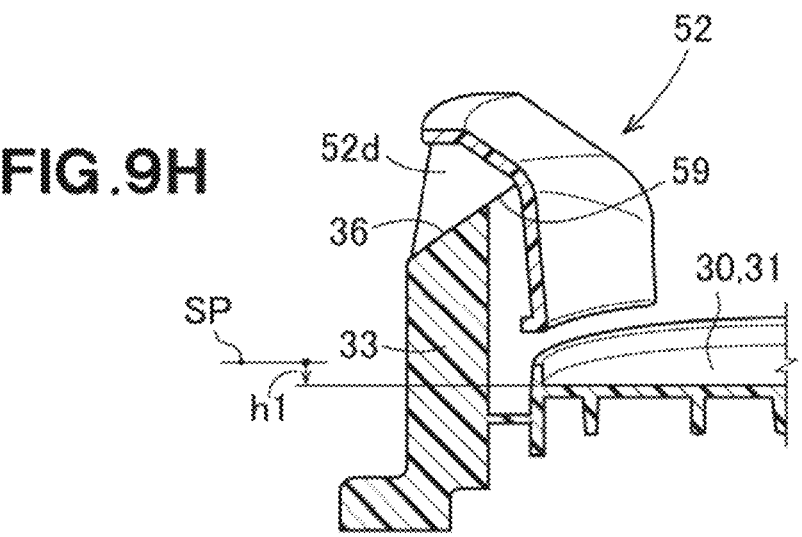

As shown in FIG. 9H, when the movable floor 30 is lowered by the distance h1 from the standby position SP, the inclined surface 59 moves along the cam drive surface 36, and the support member 52 begins to advance into the storage space.

Figure 9I:
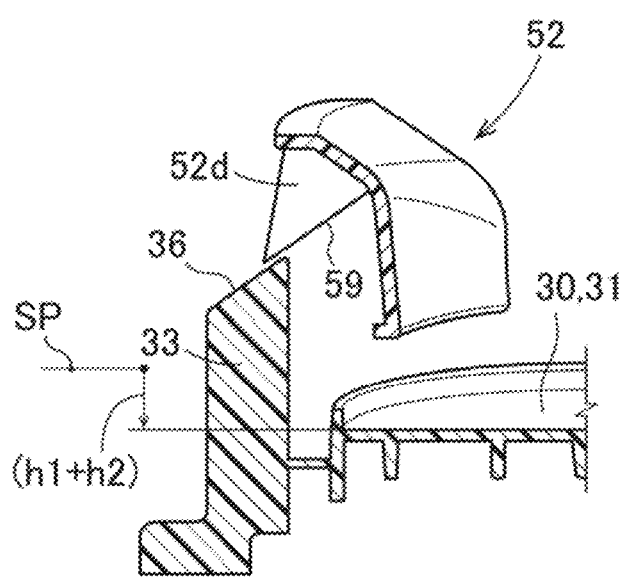

As shown in FIG. 9I, when the movable floor 30 is further lowered by the distance h2, the cam drive surface 36 moves away from the inclined surface 59. That is, the stay 52d is separated from the support retracting member 33.

Next, a yet another modification in which the annular bearing 53 is omitted and the inclined surface 59 is formed on the upper portion of the support retracting member 33 will be described with reference to FIG. 9J to FIG. 9L.

Figure 9J:
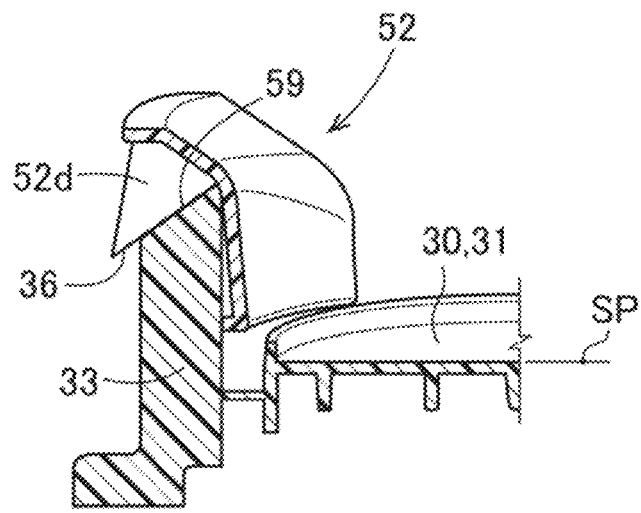
FIG. 9J to FIG. 9L are a set of diagrams to illustrate a configuration in which the annular bearing is omitted and the support retracting member has an inclined surface.

As shown in FIG. 9J, the inclined surface 59 is formed on the upper portion of the support retracting member 33, and the guide drive surface 36 is formed on the stay 52d.

Figure 9K:
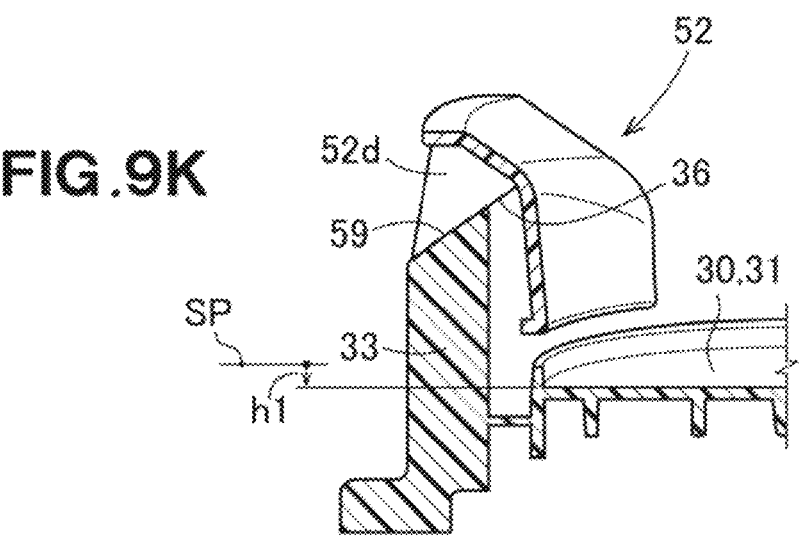

As shown in FIG. 9K, when the movable floor 30 is lowered by the distance h1 from the standby position SP, the cam drive surface 36 moves along the inclined surface 59, and the support member 52 begins to advance into the storage space.

Figure 9L:
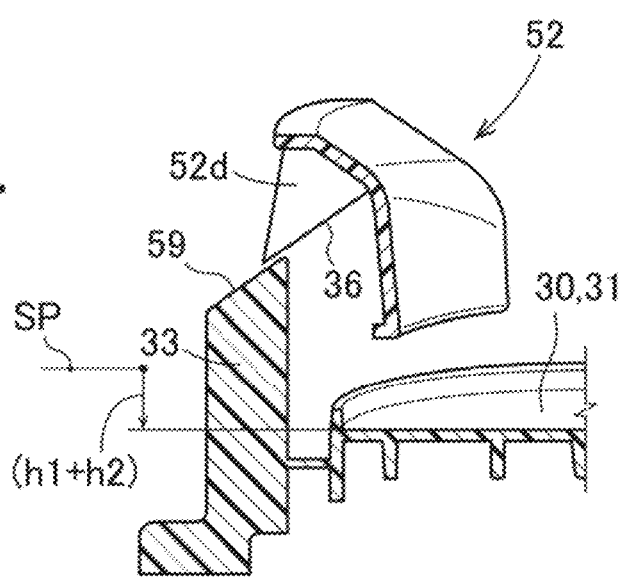

As shown in FIG. 9L, when the movable floor 30 is further lowered by the distance h2, the inclined surface 59 moves away from the cam drive surface 36. That is, the stay 52d is separated from the support retracting member 33.

Incidentally, as shown in FIG. 8, each of the support members 52 has the guide surface 52b on the upper edge of the vertical surface 52a. The guide surface 5213 is not an essential element, but it is preferred that the guide surface 52 is provided. The reasons will be described below.

Referring to FIG. 7, as the movable floor biasing member 23 repeatedly experiences the expansion and contraction, the movable floor biasing member may have accumulated permanent elongation. If the movable floor biasing member has the accumulated permanent elongation and the beverage container is lifted upward, the movable floor 30 does not return to the position shown in FIG. 9A, but it takes the position shown in FIG. 9B or FIG. 9C. If this occurs, the movable floor biasing member 23 is immediately replaced with an appropriate biasing member. However, it is inconvenient because the storage space of the beverage container holding device 10 cannot be used until the replacement (repairing) is completed.

Before the replacement or the repairing, the guide surface 52b of each support member 52 is seen from above as shown in FIG. 11 when the beverage container holding device 10 is not in use. By depressing the guide surfaces 52b by the beverage container, it is possible to intentionally cause the support members 52 to retract into the respective pockets 24. Therefore, it is desired to provide the guide surface 52b on the upper edge of the vertical surface 52a of each support member 52.

Next, modifications to the above-described embodiment of the present invention will be described with reference to FIG. 12A to FIG. 12C and FIG. 13A to FIG. 13B.

Figure 12A:
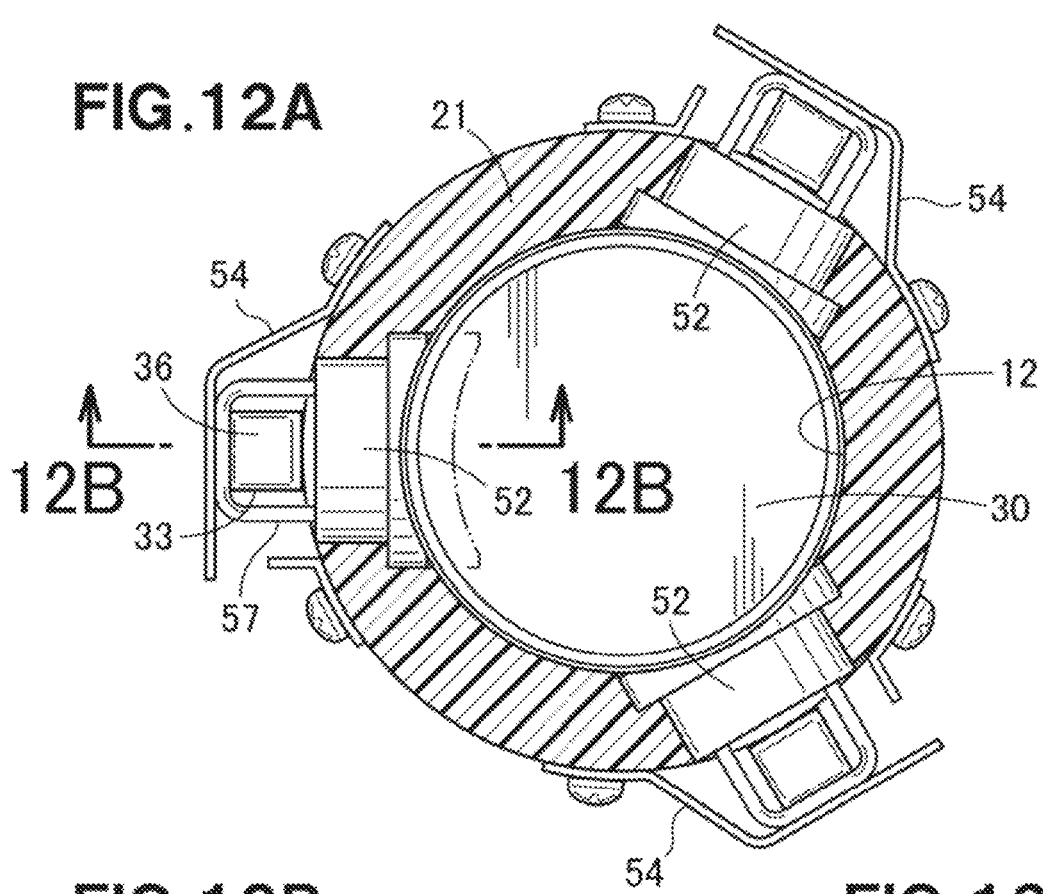
FIG. 12A to FIG. 12C are a set of views to illustrate a modification to the embodiment of the present invention.

As shown in FIG. 12A, each of the support members 52 may be a member that moves back and forth linearly relative to the storage space 12. The support member 52 has a pin 57 on its back surface, and the pin 57 has a channel shape. The support retracting member 33 is present within the realm of the pin 57 having the channel shape.

Each of the support biasing members 54 may be a leaf spring.

Figure 12B:
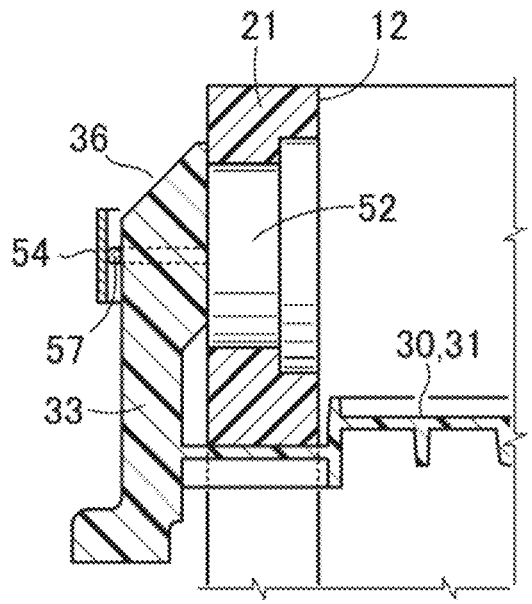

FIG. 12B is a cross-sectional view taken along the line 12B-12B in FIG. 12A. In FIG. 12B, the movable floor 30 is in a standby position, and each of the support members 52 is retracted from the storage space 12.

Figure 12C:
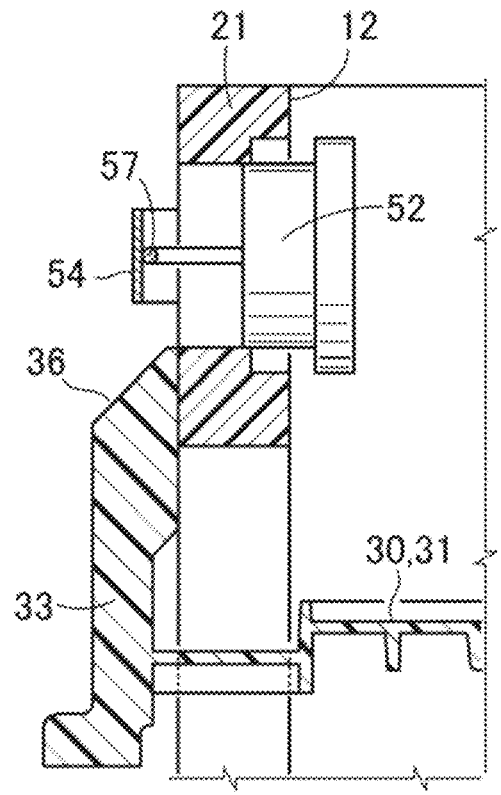

As shown in FIG. 12C, when the movable floor 30 is lowered, the biasing action of the leaf spring (support biasing member 54) causes each support member 52 to greatly advance into the storage space 12.

Figure 13B:
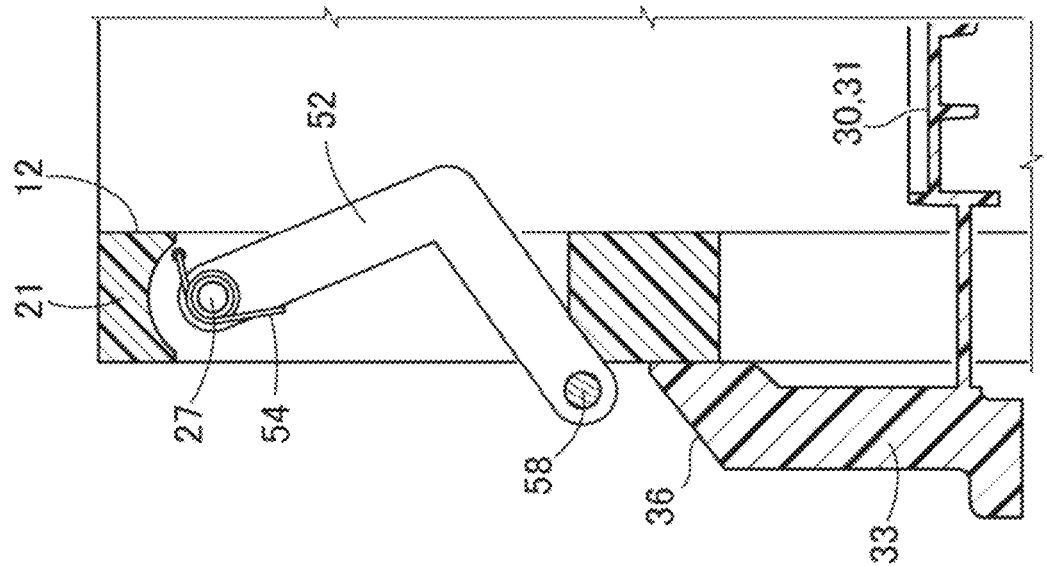
FIG. 13A and FIG. 13B are a set of views to illustrate another modification to the embodiment of the present invention.
Figure 13A:
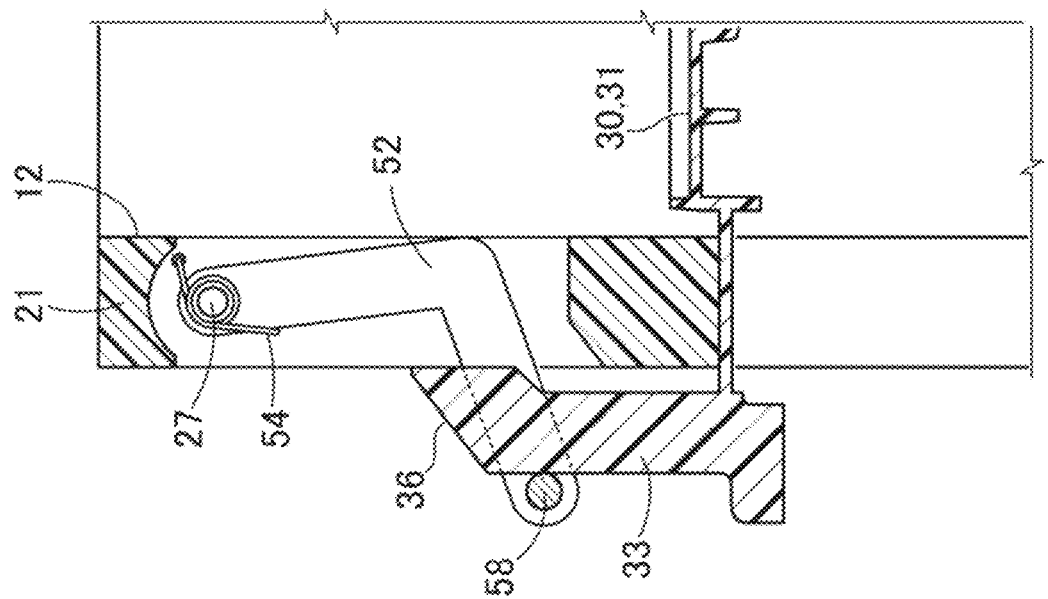

Further, as shown in FIG. 13A, the support member 52 may be an L-shaped arm that rotates about a horizontal pin 27. The support member 52 includes a transverse pin 58 at a location away from the horizontal pin 27.

Upon lowering the movable floor 30, the support retracting member 33 is lowered.

Then, as shown in FIG. 13B, the support member 52 is caused to rotate about the horizontal pin 27 by the biasing action of the support biasing member 54 such that the support member 52 greatly advances into the storage space 12.

As described above, each of the support members 52 may have any suitable shape such as an arc shape or an L-shape.

Also, the support biasing member 54 may be any suitable biasing member such as a torsion spring or a leaf spring.

Referring now to 14A and FIG. 14B, the length of the support member 52 will be discussed.

Figure 14A:
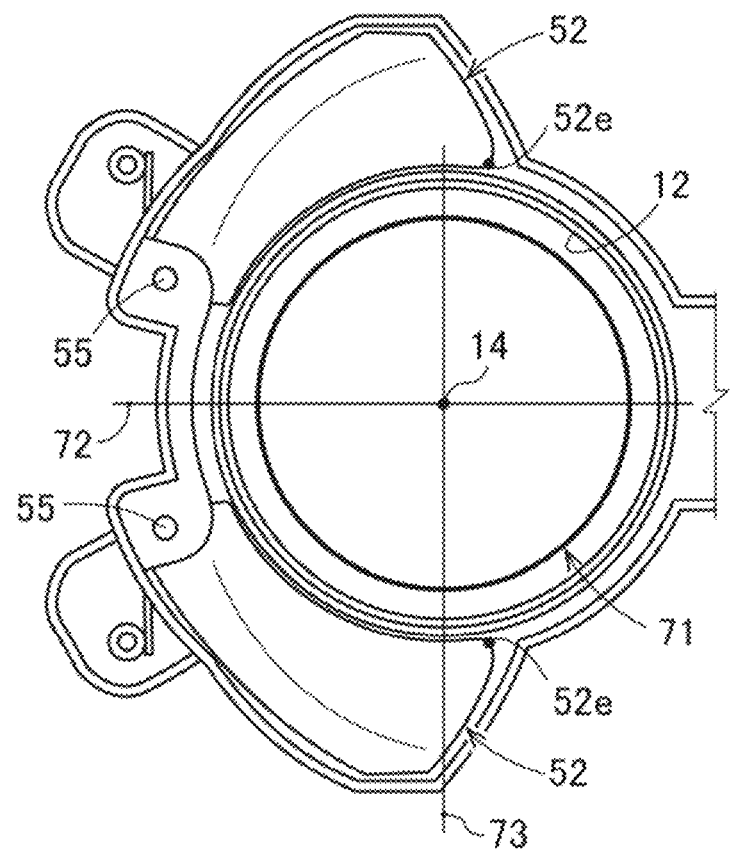
FIG. 14A and FIG. 14B are views useful to describe the different lengths of the support members.

As shown in FIG. 14A, the beverage container 71 is placed in the storage space 12 such that the center of the beverage container 71 substantially aligns with the center 14 of the storage space 12.

The two support members 52 are arranged symmetrically, with respect to the axis 72 of line symmetry. Each of the support members 52 rotates about its center of rotation (long pin 55).

The distal end 52e of each support member 52 is, in principle, a portion which firstly hits the beverage container 71. The distal end 52e of the support member 52 is set at a position farthest or sufficiently far from the center of rotation (long pin 55).

Draw a line 73 that passes through the center 14 of the storage space 12 and is perpendicular to the axis 72 of line symmetry. If the distal ends 52e of the two support members 52 protrude from the line 73, the support members 52 can satisfactorily support the beverage container 71.

The above-described arrangement relationship may be expressed in the following way; the line 73 that passes through the center 14 of the storage space 12 and is perpendicular to the axis 72 of line symmetry is present (extends) between the distal ends 52e and the rotation centers (long pins 55).

A more preferred exam Ile than the configuration shown in FIG. 14A will be described with reference to FIG. 14B.

Figure 14B:
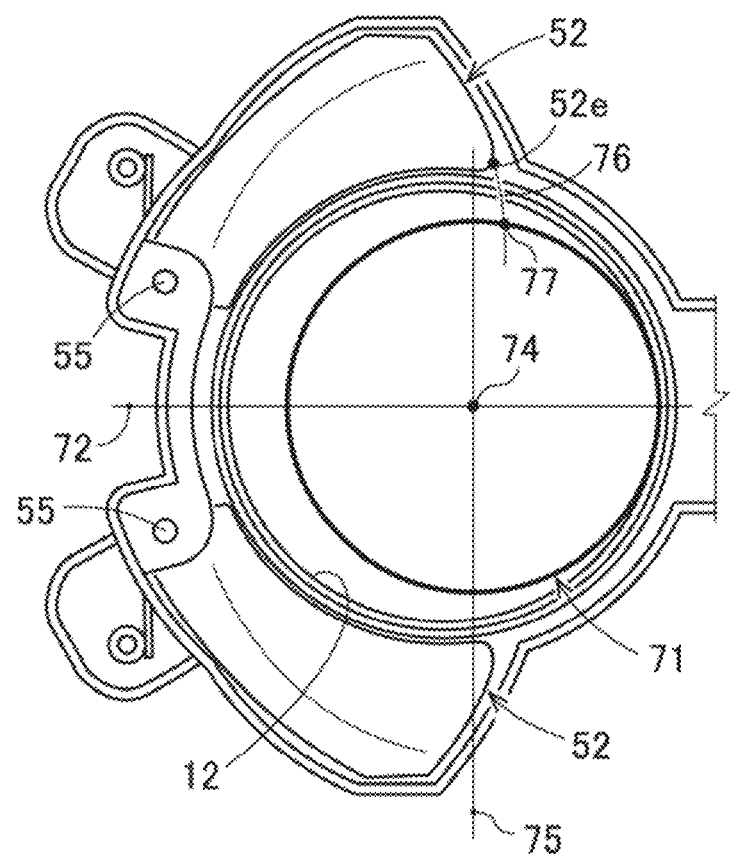
Figure 15:
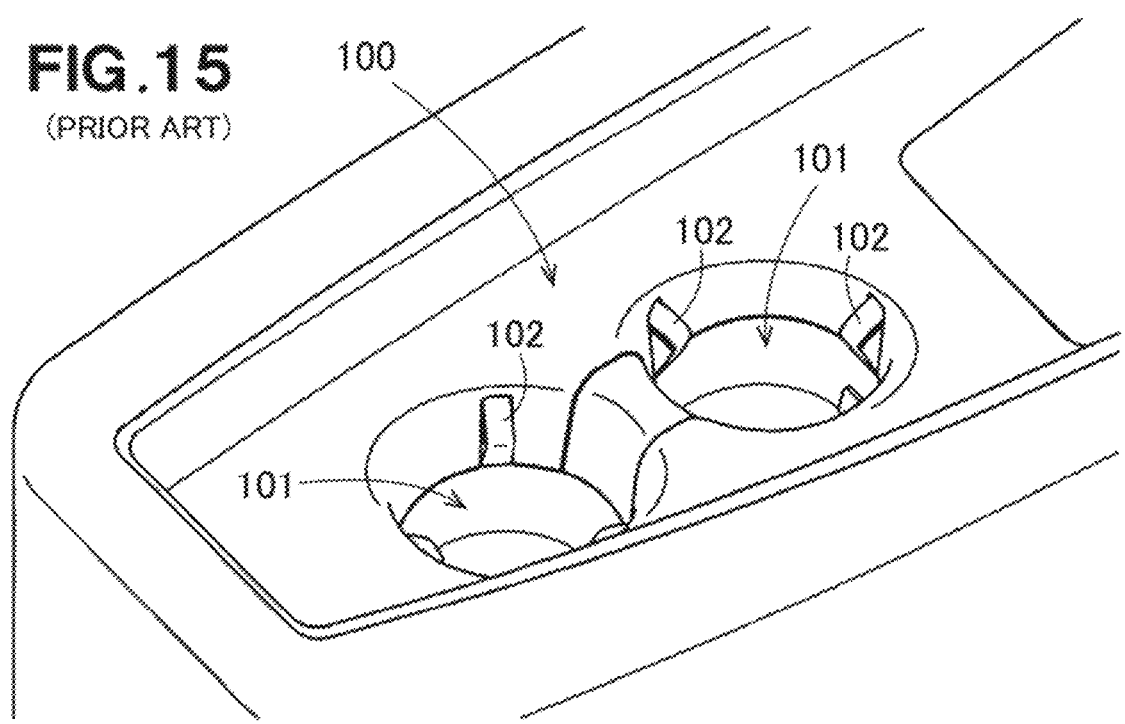
FIG. 15 is a perspective view of a conventional cup holder.
Figure 16:
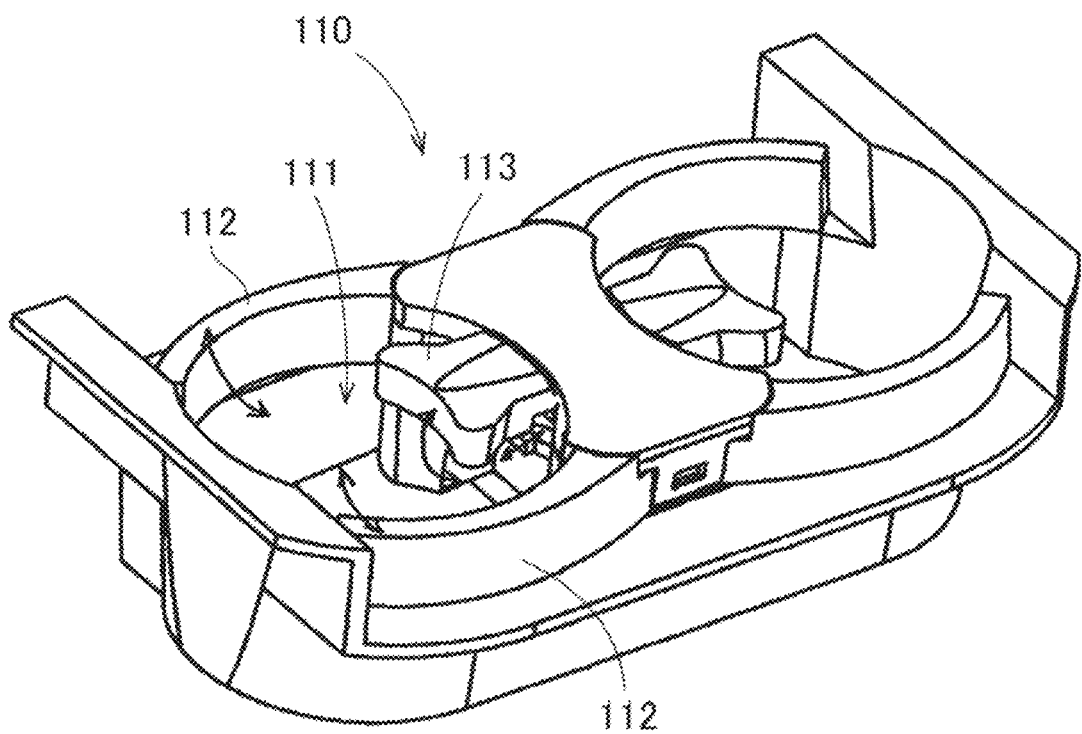
FIG. 16 is a perspective view of another conventional cup holder.

As shown in FIG. 14B, a beverage container 71 having a minimum outer diameter, such as a slim-sized can, is placed in contact with a particular wall portion of the storage space 12 (the beverage container is placed off the center 14 of the storage space) such that the beverage container 71 is situated away from the rotation centers (long pins 55).

Draw a line 75 that passes through the center 74 of the beverage container 71 and is perpendicular to the axis 72 of line symmetry. Draw a locus 76 of the distal end 52e, with the center of the locus being the rotation center (long pin 55). The locus 76 hits the beverage container 71, and an intersection 77 between the locus 76 and the beverage container 71 is defined. If the intersection 75 is set outer than the line 75, i.e., at a position farther from the rotation center (long pin 55) than the line 75, it is easy for the support member 52 to catch (pull) and bold the beverage container 71 in a position closer to the rotation center. Thus, the beverage container holding device 10 can reliably support the beverage container even if the beverage container is a slim-sized can and placed off the center 14 of the storage space.

The above-described arrangement relationship may be described in the following way; the line 75 that passes through the center 74 of the beverage container 71 and is perpendicular to the axis 72 of line symmetry is present between the intersection 77, which the locus 76 of the distal end 52e about the rotation center (long pin 55) intersects the beverage container 71, and the rotation center (long pin 55).

It should be noted that although the beverage container holding device 10 of the present invention is suitable or advantageous for use in passenger cars, the beverage container holding device 10 may also be applied to other land vehicles such as trucks and buses, and also applied to aircrafts and ships. Use of the beverage container holding device in the passenger cars is more advantageous because the appearance of the beverage container holding device is important for the passenger cars.

The beverage container holding device of the present invention is suitable for passenger cars.

What is claimed:

1. A beverage container holding device comprising:
    a storage member comprising a storage space whose top is open and configured to receive a beverage container, and a movable floor attached to the storage member such that the movable floor can move up and down and is configured to support a bottom of the beverage container,
    the storage member comprising at least one support member configured to advance into the storage space and support the beverage container, and at least one support biasing member associated with the at least one support member respectively for causing the at least one support member to advance into the storage space, and
    the movable floor comprising at least one support retracting member associated with the at least one support member respectively for causing the at least one support member to move backward and retract from the storage space.

2. The beverage container holding device according to claim 1, wherein when the movable floor is in a standby position, the at least one support retracting member causes the at least one support member to retract from the storage space, and when the movable floor is lowered a predetermined distance from the standby position, the at least one support retracting member causes the at least one support member to advance into the storage space.

3. The beverage container holding device according to claim 1, wherein said at least one support member has an arcuate shape that bends along an edge of the storage space of the storage member, and one end of said at least one support member is fastened to the storage member such that said at least one support member can pivot horizontally,
    said at least one support member has a stay extending to said at least one support retracting member, and
    an annular bearing is provided on one of an upper portion of the stay and an upper portion of said at least one support retracting member such that the annular bearing can rotate, and a cam drive surface that the annular bearing contacts is provided on the other of the upper portion of the stay and the upper portion of said at least one support retracting member, such that said at least one support member is retracted from the storage space by said at least one support retracting member that moves up.

4. The beverage container holding device according to claim 1, wherein said at least one support member comprises an arcuate shape that bends along an edge of the storage space of the storage member, and one end of said at least one support member is fastened to the storage member such that said at least one support member can horizontally pivot, said at least one support member has a stay extending to said at least one support retracting member, and an inclined surface is provided one of an upper portion of the stay and an upper portion of said at least one support retracting member, and a cam drive surface that the inclined surface contacts is provided on the other of the upper portion of the stay and the upper portion of said at least one support retracting member, such that said at least one support member is retracted from the storage space by each said at least one support retracting member that moves up.

5. The beverage container holding device according to claim 3, wherein when said at least one support member advances into the storage space, the stay is moved away from said at least one support retracting member.

6. The beverage container holding device according to claim 4, wherein when said at least one support member advances into the storage space, the stay is moved away from said at least one support retracting member.

7. The beverage container holding device according to claim 1, wherein said at least one support member comprises a vertical surface as a front surface thereof and a guide surface that extends outwardly and upwardly in an oblique fashion from an upper edge of the vertical surface.

8. The beverage container holding device according to claim 3, wherein the at least one support member comprises two said support members that are arranged symmetrically with respect to an axis of line symmetry, each said support member is supported by a rotation center such that each said support member can rotate about the rotation center, and comprises a distal end at a location away from the rotation center, and a line that passes through a center of the storage space and is perpendicular to the axis of line symmetry is present between the distal end and the rotation center.

9. The beverage container holding device according to claim 4, wherein the at least one support member comprises two said support members that are arranged symmetrically with respect to an axis of line symmetry, each said support member is supported by a rotation center such that each said support member can rotate about the rotation center, and comprises a distal end at a location away from the rotation center, and a line that passes through a center of the storage space and is perpendicular to the axis of line symmetry is present between the distal end and the rotation center.

10. The beverage container holding device according to claim 3, wherein the at least one support member has two said support members that are arranged symmetrically with respect to an axis of line symmetry, each said support member is supported by a rotation center such that each said support member can rotate about the rotation center, and comprises a distal end at a location away from the rotation center, and a line that passes through a center of the beverage container and is perpendicular to the axis of line symmetry is present between an intersection, at which a locus of the distal end about the rotation center intersects the beverage container, and the rotation center.

11. The beverage container holding device according to claim 4, wherein the at least one support member has two said support members that are arranged symmetrically with respect to an axis of line symmetry, each said support member is supported by a rotation center such that each said support member can rotate about the rotation center, and comprises a distal end at a location away from the rotation center, and a line that passes through a center of the beverage container and is perpendicular to the axis of line symmetry is present between an intersection, at which a locus of the distal end about the rotation center intersects the beverage container, and the rotation center.

* * * * *